United States Patent
Doshay

(10) Patent No.: US 6,324,393 B1
(45) Date of Patent: Nov. 27, 2001

(54) AUTO LOCATING EMERGENCY RESCUE TRANSMITTER (ALERT)

(76) Inventor: Irving Doshay, 380 Surfview Dr., Pacific Palisades, CA (US) 90272

( * ) Notice: Subject to any disclaimer, the term of this patent is extended or adjusted under 35 U.S.C. 154(b) by 0 days.

(21) Appl. No.: 09/277,519

(22) Filed: Mar. 26, 1999

Related U.S. Application Data

(60) Provisional application No. 60/082,565, filed on Apr. 21, 1998.

(51) Int. Cl.$^7$ .................................................. H04M 11/00
(52) U.S. Cl. ............................ 455/404; 455/99; 340/436; 340/438
(58) Field of Search ..................... 455/91, 98, 99, 455/404, 412; 342/357.01, 357.06; 340/988, 989, 991, 993, 425.5, 436, 438

(56) References Cited

U.S. PATENT DOCUMENTS

| | | | |
|---|---|---|---|
| Re. 35,920 | * 10/1998 | Sorden et al. | 342/457 |
| 4,630,289 | * 12/1986 | Wren | 375/312 |
| 4,777,658 | * 10/1988 | Wren | 455/260 |
| 4,888,595 | * 12/1989 | Friedman | 342/457 |
| 5,193,215 | * 3/1993 | Olmer | 455/66 |
| 5,554,993 | * 9/1996 | Brickell | 342/357 |
| 5,705,980 | * 1/1998 | Shapiro | 340/539 |
| 5,729,205 | * 3/1998 | Kwon | 340/573 |
| 5,898,369 | * 4/1999 | Godwin | 340/539 |
| 5,905,461 | * 5/1999 | Neher | 342/357 |
| 5,914,675 | * 6/1999 | Tognazzini | 340/989 |
| 5,982,322 | * 11/1999 | Bickley et al. | 342/357 |

* cited by examiner

Primary Examiner—William Trost
Assistant Examiner—Congvan Tran
(74) Attorney, Agent, or Firm—Norton R. Townsley

(57) ABSTRACT

Auto Locating Emergency Rescue Transmitter (ALERT), is an automatic emergency signal generator that broadcasts a radio frequency (rf) signal that can be locally received across the entire AM band spectrum for guiding rescuers to the location of a distressed automobile, aircraft or other vehicle that may also be outside of anyone's cognizance. The preferred embodiment includes an additional amplifier/modulator with a pre-recorded voice or tone-coded message that may be installed in or provided as an adjunct to the vehicle's existing radio. To use this embodiment, rescuers may determine the location of the distressed vehicle by standard rf signal tracking techniques. However, using recently available technologies, an alternate embodiment provides map grid co-ordinates to rescuers via a link to the Global Positioning Satellite (GPS) System. In either embodiment activation of the system is accomplished via an inertia switch or manual override switch in the vehicle. In later model automobiles the inertia switch is already also present to activate the air bag. This switch may be redundantly linked to the ALERT system.

21 Claims, 1 Drawing Sheet

AUTO LOCATING EMERGENCY RESCUE TRANSMITTER (ALERT)

REFERENCES

This invention was disclosed to the US Patent and Trademark Office under Document Disclosure No. 345,692 dated May 24, 1994. The Applicant claims the benefit of his Provisional Patent Application, Serial No. 60/082,565 filed Apr. 21, 1998.

BACKGROUND OF THE INVENTION

The present invention relates to the field of emergency radio transmitters and more particularly to emergency transmitters that are automatically activated in case of an accident.

Air and ground transport vehicles frequently have accidents in remote areas. Often the occurrence of the accident is not known and the location may be hidden from view. When such incidents happen, and the proper agencies notified, search and rescue teams may be mobilized. Often the teams must first search over wide areas in order to locate the damaged vehicle and its occupants. This search and rescue process takes considerable time and as a result the chances of saving lives are greatly reduced.

Of course two way microwave radios or cellular phones may fulfill the function of accident notification but only if the persons involved in the accident possess such devices and are sufficiently alert and knowledgeable to provide required location information, and the vehicle is not in a location that precludes line-of-sight communication. This presupposes the ability for signals from the devices reaching a suitable receiver or repeater station in order to alert a known rescue function, which must then have sufficient information to search in close proximity to the accident location. While they may or may not be suitable, two way radios and cell phones, and cell phone systems such as GM's "On-Star" or Ford's "Rescu", are expensive and inefficient ways of accomplishing the goal of remote accident notification. For example the Mayday Operational Test Report[1] supported by Federal Highway Funding shows only 80% data connection rate using cell phones.

[1] Castle Rock Consultants, October 1997, p. 30, Table 51

What is needed to help save lives, is an emergency locating transmitter that is automatically activated in case of an accident and that generates a rescue signal that is broadcast to multiple rescue resources with an infallible assurance of a rescue result. Development of a system which can broadcast such a locating signal in case of an accident even without the need of a live voice to send a message relative to the identification and location of the vehicle represents a great improvement in the field of transportation safety communication and satisfies a long felt need of security agencies and the traveling public.

SUMMARY OF THE INVENTION

The present invention, Auto Locating Emergency Rescue Transmitter (ALERT), is an automatic, impact or manually initiated, emergency signal generator that broadcasts a radio frequency (rf) signal for guiding rescuers to the location of a distressed automobile, aircraft or other vehicle that may also be outside of anyone's cognizance. Manual initiation is included in order to test the invention and to provide an alternate means for initiation in an emergency in case the impact is insufficient for initiation or the impact initiation does not work for some reason. The preferred embodiment includes an additional amplifier/modulator with a pre-recorded voice and tone-coded message that may be installed in or provided as an adjunct to the vehicle's existing radio. To use this embodiment, rescuers may determine the location of the distressed vehicle by standard rf signal tracking techniques.

However, using recently available technologies, an enhanced alternate embodiment provides map grid co-ordinates to rescuers via a link to the Global Positioning Satellite (GPS) System. In either embodiment activation of the system is accomplished via an inertia switch in the vehicle, which, in later model automobiles is already present to activate the air bag. This switch may be linked to the ALERT system in parallel and thus redundant to the inertia switch, that can also be manually initiated, which is included in ALERT.

The main objectives of the preferred embodiment of the present invention are: 1) automatic, redundant activation when an accident occurs; 2) manual activation for test and alternate initiation purposes; 3) automatic generation of a distress signal upon activation that is redundant and assured; 4) communication equipment that operates at sufficiently low AM frequency to assure reception that will be received by all radios operating at any AM frequency within several miles; 5) communication equipment that is added to or built in to existing radio equipment carried in the vehicle; 6) provision of a wide range of frequency reception AM band, interference type trace signal; and 7) provision of periodic, repeating pre-recorded rescue plea and vehicle identification information. It is the additional objectives of the alternate and more costly embodiment of the present invention to provide: 8) map co-ordinate information via the GPS system.

An appreciation of the other aims and objectives of the present invention and an understanding of it may be achieved by referring to following description of the preferred embodiments of the ALERT system.

DETAILED DESCRIPTION OF THE PREFERRED EMBODIMENTS

Figure 1:
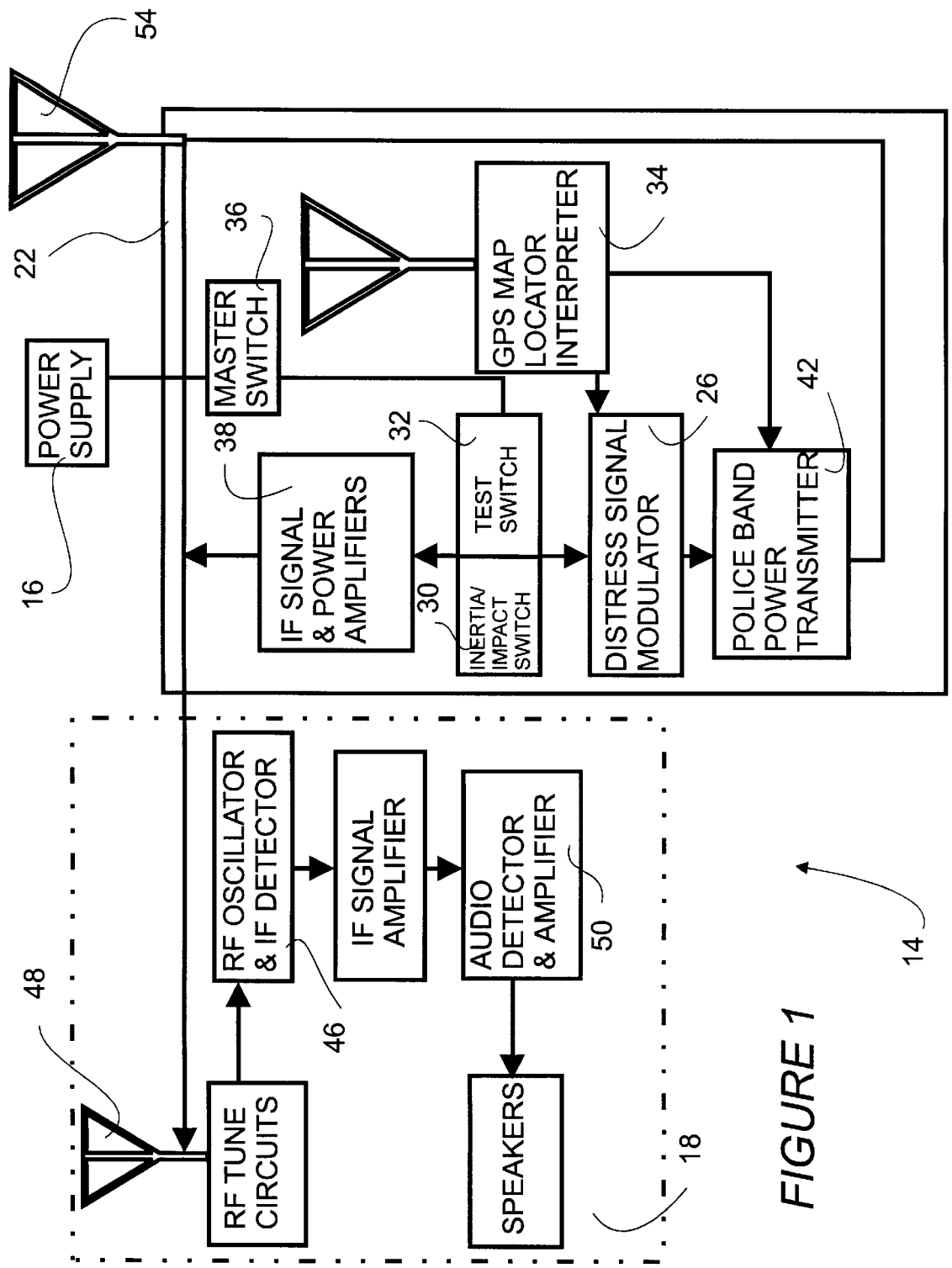
FIG. 1 is a block diagram illustrating all the versions of this invention.

FIG. 1 illustrates how the preferred embodiment of this invention may easily be implemented in a short time via an addition to the design and production of the standard radio 14 installed in the vehicle. Before specially modified radios 14 are produced and available, the standard radio 18 can be modified via a kit 22 that can be installed as an adjunct to the standard radio 18 itself. The modified radio 14 as well as the kit version 22 includes, as a minimum, an additional amplifier/modulator 26 connected to an inertia switch 30 and the vehicle's power supply 16. Connected in parallel with the inertia switch 30 is a manually operated test switch 32. Connected in series with these switches 30, 32 is a master switch 36. For convenience, the test and master switches 32, 36 could be incorporated in one, double pole, double throw switch.

The inertia switch 30 is capable of detecting when the vehicle is involved in a damaging accident upon impact and is already redundantly available in vehicles with air bags. The manual test switch 32 provides an alternate method of initiation for test and other emergency notification purposes. The master switch 36 is used to turn off the system after it has been activated by the inertia switch 30. Normally, the inertia and test switches 30, 32 are open and the master switch 36 is closed. The amplifier/modulator 26 includes an alternating, pre-recorded voice, and tone message. In addition, ALERT can include a GPS map locator interpreter 34 to provide map related guidance to rescue vehicles.

The pre-recorded message contains the vehicle license or vehicle identification number or any other number or description capable of identifying that particular vehicle. When the vehicle is involved in a damaging accident, the inertia switch 30 is closed. This, in turn, activates power to the ALERT amplifier/modulator 26. This causes the alternating, pre-recorded voice, and tone message to be continuously broadcast via an intermediate frequency (IF) power amplifier 38. The message is broadcast at the IF frequency, which is usually 456 kHz, so that it will be received over a wide range of frequencies which are converted to the superheterodyne standard IF frequency, so that it will come through any AM broadcast receivers turned on within a several mile range. Messages received may be relayed by the message recipient to the 911 emergency system or directly received by the police who will be able to respond. Rescuers will then be able to trace the source of the emergency broadcast by radio direction finding or triangulation. Upon rescue, rescuers will be able to turn off the ALERT 22 and stop the emergency broadcasts by turning off the master switch 36. Of course, the ALERT 22 will cease to function and stop broadcasting if the power supply 16 is damaged or becomes exhausted.

As shown on FIG. 1, the additional circuitry to create the modified radio 14 or the kit 22 is a completely independent augmentation of the standard radio 18. Of course, in order to enable broadcasting and monitoring of the message, connection is also made from the ALERT kit IF power amplifier 38 to the radio's antenna 48. Alternatively, ALERT 22 could include its own auxiliary antenna 54.

More expensive versions of ALERT include police or other assigned emergency band transmitters 42 so that the emergency signal will be broadcast directly to a security service, such as the police. Such systems may also include a link 34 to the GPS system so that the broadcast message can include the exact location of the vehicle.

The following reference numerals are used on FIG. 1:
14 ALERT modified vehicle radio
16 Vehicle power supply
18 Standard vehicle radio without ALERT modification
22 ALERT radio modification kit
26 Additional amplifier/modulator
30 Inertia switch
32 Manually operated test switch
34 GPS interpreter
36 Manually operated master switch
38 IF power amplifier
42 Emergency band transmitter
46 RF oscillator and detector
48 Antenna
50 Audio detector and amplifier
54 Alternative auxiliary antenna ALERT 22 has been described with reference to particular embodiments. Other modifications and enhancements can be made without departing from the spirit and scope of the claims that follow.

What is claimed is:

1. An automatic locating emergency rescue transmitter (ALERT) for a vehicle having a power supply comprising:
   a. an antenna;
   b. an IF signal/power amplifier, designed for transmitting over the entire AM frequency band, connected to said antenna;
   c. a normally open inertia switch connected to said IF signal/power amplifier; said inertia switch designed to be closed by a damaging accident;
   d. a normally closed master switch connected in series between said power supply, and said inertia switch; said master switch designed to be manually opened and closed;
   e. a distress signal modulator, connected to said inertia switch;
   f. a normally open test switch connected in parallel to said inertia switch; said test switch designed to be manually opened and closed and
   g. a distress signal contained in said distress signal modulator; said distress signal being an alternating pre-recorded voice message and tone signal;

whereby, when said master switch is closed and said inertia switch or said test switch is closed, said distress signal modulates said IF signal/power amplifier and said distress signal is sent to said antenna, where said distress signal is repeatedly and continually broadcast for reception by all operating AM receivers within reception range; and when said master switch is opened, nothing will be broadcast no matter what the state of said inertia switch and said test switch.

2. The ALERT as claimed in claim 1 in which said inertia switch is part of said vehicle's air bag system.

3. The ALERT as claimed in claim 1 in which said vehicle has an air bag system.

4. An automatic locating emergency rescue transmitter as claimed in claim 1 in which said antenna is part of said vehicle's existing radio.

5. An automatic locating emergency rescue transmitter as claimed in claim 1 further comprising a GPS map locator/interpreter connected to said distress signal modulator; said distress signal modulator being adapted to determine location information from said GPS map locator/interpreter and to include said location information in said distress signal.

6. The ALERT as claimed in claim 5 in which said inertia switch is part of said vehicle's air bag system.

7. The ALERT as claimed in claim 5 in which said vehicle has an air bag system.

8. An automatic locating emergency rescue transmitter as claimed in claim 5 in which said antenna is part of said vehicle's existing radio.

9. An automatic locating emergency rescue transmitter as claimed in claim 1 further comprising an emergency band transmitter connected between said distress signal modulator and said antenna; whereby, when said inertia switch or said switch is activated, said distress signal also modulates said emergency band transmitter to said antenna, where said distress signal is repeatedly broadcast directly to an emergency service.

10. The ALERT as claimed in claim 9 in which said inertia switch is part of said vehicle's air bag system.

11. The ALERT as claimed in claim 9 in which said vehicle has an air bag system.

12. An automatic locating emergency rescue transmitter as claimed in claim 9 in which said antenna is part of said vehicle's existing radio.

13. An automatic locating emergency rescue transmitter as claimed in claim 9 further comprising a GPS map locator/interpreter connected to said distress signal modulator and said emergency band transmitter; said distress signal modulator being adapted to determine location information from said GPS map locator/interpreter and to include said location information in said distress signal.

14. The ALERT as claimed in claim 13 in which said inertia switch is part of said vehicle's air bag system.

15. The ALERT as claimed in claim 13 in which said vehicle has an air bag system.

16. An automatic locating emergency rescue transmitter as claimed in claim 13 in which said antenna is part of said vehicle's existing radio.

17. A method of automatically locating a vehicle in an emergency, said vehicle having a power supply and an antenna, comprising the steps of:
   a. providing an IF signal/power amplifier designed for transmitting over the entire AM frequency band;
   b. providing a normally closed inertia switch; said inertia switch designed to be closed by a damaging accident;
   c. providing a normally closed master switch; said master switch designed to be manually opened and closed;
   d. providing a normally open test switch; said test switch designed to be manually opened and closed;
   e. providing a distress signal modulator;
   f. incorporating a distress signal in said distress signal modulator; said distress signal being an alternating pre-recorded voice message and tone signal;
   g. connecting said IF signal/power amplifier to said antenna;
   h. connecting said inertia switch to said IF signal/power amplifier;
   i. connecting said master switch in series between said inertia switch and said power supply;
   j. connecting said distress signal modulator to said inertia switch;
   k. connecting said test switch in parallel to said inertia switch;
   l. ensuring that said master switch is in the closed position;
   m. closing said inertia switch by a damaging accident or said test switch manually; whereby said distress signal modulates said IF signal/power amplifier and said distress signal is sent to said antenna, where said distress signal is repeatedly and continually broadcast for reception by all operating AM receivers within reception range; and
   n. to stop transmissions,
      i. if said test switch is closed, opening said test switch manually; and
      ii. if said inertia switch is closed, opening said master switch manually.

18. A method of automatically locating a vehicle in an emergency as claimed in claim 17 comprising the additional steps of:
   a. providing an auxiliary antenna; and
   b. connecting said IF signal/power amplifier to said auxiliary antenna instead of said antenna.

19. A method of automatically locating a vehicle in an emergency as claimed in claim 17 further comprising the steps of:
   a. providing a GPS map locator/interpreter;
   b. adapting said distress signal modulator to determine location information from said GPS map locator/interpreter and to include said location information in said distress signal; and
   c. connecting said GPS map locator/interpreter to said distress signal modulator.

20. A method of automatically locating a vehicle in an emergency as claimed in claim 19 further comprising the steps of:
   a. providing an emergency band transmitter;
   b. connecting said emergency band transmitter between said distress signal modulator and said antenna; whereby, when said inertia switch or said test switch is closed, said distress signal also modulates said emergency band transmitter to said antenna, where said distress signal is repeatedly broadcast directly to an emergency service.

21. A method of automatically locating a vehicle in an emergency as claimed in claim 17 further comprising the steps of:
   a. providing an emergency band transmitter;
   b. connecting said emergency band transmitter between said distress signal modulator and said antenna; whereby, when said inertia switch or said test switch is closed, said distress signal also modulates said emergency band transmitter to said antenna, where said distress signal is repeatedly broadcast directly to an emergency service.

* * * * *